US006670918B2

(12) United States Patent
Guiraud et al.

(10) Patent No.: US 6,670,918 B2
(45) Date of Patent: Dec. 30, 2003

(54) METHOD OF REPOINTING A REFLECTOR ARRAY ANTENNA

(75) Inventors: Cécile Guiraud, Toulouse (FR); HervéLegay, Plaisance du Touch (FR); Marie-Laure Boucheret, Goyrans (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 10/175,069

(22) Filed: Jun. 20, 2002

(65) Prior Publication Data

US 2002/0196182 A1 Dec. 26, 2002

(30) Foreign Application Priority Data

Jun. 21, 2001 (FR) ............................................ 0108181

(51) Int. Cl.[7] ........................... H01Q 3/00; H04B 7/185

(52) U.S. Cl. ....................................... 342/377; 342/354

(58) Field of Search ................................ 342/368–384, 342/354

(56) References Cited

U.S. PATENT DOCUMENTS

| | | | | | |
|---|---|---|---|---|---|
| 4,216,475 A | * | 8/1980 | Johnson | 342/373 |
| 4,596,986 A | * | 6/1986 | Andrews et al. | 342/373 |
| 4,901,085 A | * | 2/1990 | Spring et al. | 342/373 |
| 4,907,004 A | * | 3/1990 | Zacharatos et al. | 342/373 |
| 5,115,248 A | * | 5/1992 | Roederer | 342/373 |
| 5,151,706 A | * | 9/1992 | Roederer et al. | 342/373 |
| 5,689,272 A | * | 11/1997 | Harrison et al. | 342/373 |
| 5,805,575 A | | 9/1998 | Kamin, Jr. | |
| 5,812,089 A | * | 9/1998 | Locke | 342/373 |
| 5,929,804 A | | 7/1999 | Jones et al. | |
| 5,955,920 A | * | 9/1999 | Reudink et al. | 333/109 |
| 6,208,294 B1 | | 3/2001 | Kobayakawa et al. | |
| 6,252,560 B1 | * | 6/2001 | Tanaka et al. | 342/375 |
| 2002/0005800 A1 | | 1/2002 | Caille et al. | |

FOREIGN PATENT DOCUMENTS

| | | | | |
|---|---|---|---|---|
| CA | 235119 A1 * | 1/2002 | H01Q/21/29 |
| FR | 1526195 | 5/1968 | |

OTHER PUBLICATIONS

The fast Fourier transform and the Butler matrix, W. Nester, IEEE Transactions on Antennas and Propagation, vol. 16(3), p. 360, May 1968.*

Boresight errors induced by missile radomes, K. Siwiak et al., IEEE Transactions on Antennas and Propagation, vol. 24(6), p. 832–841, Nov. 1979.*

Monopulse–radar angle tracking in noise or noise jamming, A.D. Seifer, IEEE Transactions on Aerospace and Electronic Systems, vol. 28(3), p. 622–638, Jul. 1992.*

Antenna technologies for multimedia mobile satellite communications, M. Lisi, Eleventh International Conference on Antennas and Propagation, (IEE Conf. Publ. No. 480), vol. 1, p. 241–245, 2001.*

* cited by examiner

*Primary Examiner*—Thomas H. Tarcza
*Assistant Examiner*—F H Mull
(74) *Attorney, Agent, or Firm*—Sughrue Mion, PLLC

(57) ABSTRACT

The present invention relates to a method of repainting a reflector array antenna comprising a plurality of radiating elements and being of the type that forms beams by computation, in which method each signal received by said antenna is sampled.

The method comprises the following operations:

estimating the depointing of the radiation pattern of the antenna to obtain a phase shift matrix, computing the discrete inverse Fourier transform of the signal samples supplied by the radiating elements, multiplying the phase shift matrix by the inverse Fourier transform of the sampled signal, and computing the discrete direct Fourier transform of the product of the phase shift matrix and the inverse Fourier transform of the sampled signal.

7 Claims, 3 Drawing Sheets

METHOD OF REPOINTING A REFLECTOR ARRAY ANTENNA

The present invention relates to a method of repainting a reflector array antenna, especially a reflector array antenna used on board a geosynchronous satellite.

BACKGROUND OF THE INVENTION

Array antennas form one or more radiation patterns using a set of individual sources whose signals are combined by a digital or analog beamforming network. Array antennas can therefore form a plurality of patterns simultaneously, i.e. multibeam coverage, by applying a plurality of different feed laws. Multibeam coverage is frequently used in telecommunications, especially in systems using geosynchronous satellites.

Given the very high altitude of geosynchronous satellites, the multibeam coverage of the array antennas used on board them is obtained by using very narrow beams, typically having a beam width of the order of one degree. For patterns that are this directional, small amounts of depointing can cause strong variations in the power radiated in a given direction. Consequently, it is important for the beams to be pointed very accurately. At present, a pointing accuracy of the order of 0.03° is required.

Pointing errors occur during operation of satellites. Generally speaking, a pointing error is the angular difference between the theoretical position of the antenna (and/or its reflector) and its actual position on each axis of a three-dimensional system of axes.

Pointing errors are linked in particular with the angular instability of the position of the satellite, with errors in the position of the antenna relative to the satellite, and with internal deformation of the antenna, such as thermal deformation of the reflector. The first two sources of error are the dominant ones and lead to an overall pointing error for all the spots formed by the antenna.

The satellite has attitude control systems, but these achieve accuracy of the order of only one tenth of a degree, which is insufficient with geosynchronous satellites in which the coverage is provided by multiple narrow beams. The antenna must therefore have its own repainting system.

The array antennas used on board satellites can be of two main types, both of which are well known to the person skilled in the art: direct radiation antennas and reflector antennas.

With direct radiation antennas, there is a simple analytical model of the signal received by the elements of the array. The phase of the signals received by the radiating elements is directly related to the direction of arrival of the incident signal. The beam is repointed by in-phase addition of the signals received by the various radiating elements and coming from the required pointing direction. In the same manner, repainting is therefore effected simply as a function of the measured or estimated pointing error, by adding the phase which corresponds to the pointing error to the phase applied by the nominal law.

In contrast, with reflector antennas, the received signal cannot be expressed in a simple analytical form, i.e. there is no direct relationship between the required pointing and the radiating element feed laws.

A mechanical solution is currently envisaged for correcting the pointing error of reflector array antennas: two or three motors control the position of the reflector, which is modified to correct the pointing error, which relates to two or three axes of rotation, as already mentioned.

That solution implies the installation of high precision motors. It is therefore bulky and costly.

Also, modifying the position of the reflector relative to the array changes the configuration of the antenna, which can degrade performance (in particular focusing).

Furthermore, that solution is not sufficiently accurate for large reflectors.

Finally, that solution necessitates the use of additional dedicated antennas and receivers for estimating the pointing error.

OBJECTS AND SUMMARY OF THE INVENTION

The object of the present invention is therefore to provide a method of repainting reflector array antennas that does away with the use of complex, costly, and bulky motors, but nevertheless provides sufficient accuracy, as required by geosynchronous satellites in particular.

To this end, the present invention provides a method of repainting a reflector array antenna comprising a plurality of radiating elements and being of the type that forms beams by computation, in which method each signal received by said antenna is sampled, said method comprising the following operations:

- estimating the depointing of the radiation pattern of said antenna to obtain a phase shift matrix,
- computing the discrete inverse Fourier transform of the signal samples supplied by the radiating elements,
- multiplying said phase shift matrix by said inverse Fourier transform of said sampled signal, and
- computing the discrete direct Fourier transform of the product of said phase shift matrix and said inverse Fourier transform of said sampled signal.

The present invention also provides a method of repainting a reflector array antenna comprising a plurality of radiating elements and being of the type that forms beams by computation, in which method each signal ready to be sent by said antenna is also sampled, said method comprising the following operations:

- estimating the depointing of the radiation pattern of said antenna to obtain a phase shift matrix,
- computing the discrete direct Fourier transform of the signal samples to be transmitted by the radiating elements at a given time,
- multiplying said phase shift matrix by said direct Fourier transform of said sampled signal, and
- computing the discrete inverse Fourier transform of the product of said phase shift matrix and said direct Fourier transform of said sampled signal.

The invention therefore applies a digital correction to the signal sent or received by the antenna, instead of applying a mechanical correction.

The basic idea of the invention relies on the fact that depointing the radiation pattern of the antenna corresponds to a spatial offset (i.e. a phase shift) of the signals received (or sent) by the radiating elements at the focus of the reflector and the fact that, because of the properties of the Fourier transform, offsetting the focal spot in the focal plane of the reflector is converted into simple multiplication by a phase. These operations therefore compute corrections to the signals received or sent by the depointed antenna by simulating the signals of the correctly pointed antenna.

Applying a direct or inverse Fourier transform after multiplication by the phase shift matrix produces signals equivalent to those actually received or sent by the radiating elements of the antenna.

Also, the method of the invention repoints all the beams of a reflector array antenna simultaneously.

The sampling can advantageously be effected after transposing the frequency of the radio frequency signal down to a value in an intermediate frequency band or in baseband.

The depointing is advantageously estimated by a first order digital loop from the known position of at least one fixed beacon.

BRIEF DESCRIPTION OF THE DRAWINGS

Other features and advantages of the present invention become apparent in the following description of one embodiment of the invention, which is given by way of non-limiting and illustrative example only.

In the figures.

MORE DETAILED DESCRIPTION

Figure 1:
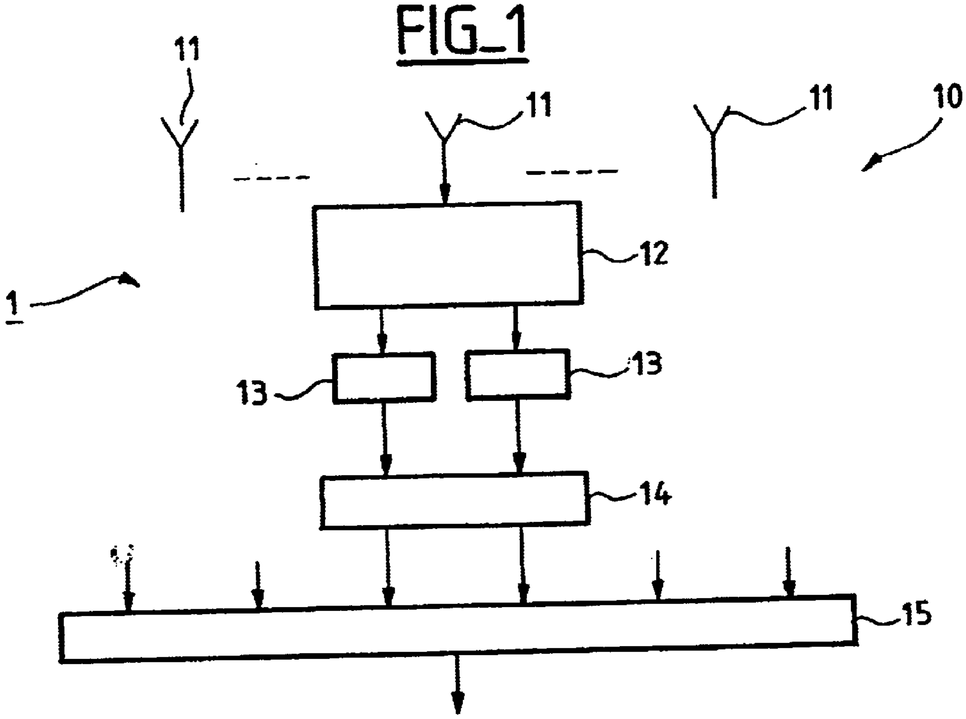
FIG. 1 shows diagrammatically the general operation of a receive network that forms beams by computation, FIG. 2 defines pointing error (depointing)

In all the figures, common items carry the same reference numerals.

As a general rule, beamforming networks have as many inputs as there are radiating elements and as many outputs as there are beams to be formed. There are two types of beamforming: analog beamforming, using a radio frequency medium, and digital beamforming (also referred to as computation beamforming), in which the signal received by the radiating elements is formatted, and then sampled, and then processed by digital processors in order to extract the wanted information from it.

The remainder of the description refers throughout to a receive antenna, but everything to be explained is equally applicable, mutatis mutandis, to transmit antennas, which differ from receive antennas mainly in their practical implementation.

FIG. 1 shows a computation beamforming antenna 1 comprising the following components:

- an array 10 of radiating elements 11,
- downstream of each radiating element 11 (or of each group of radiating elements), a receive system 12 which amplifies the radio frequency signal received by the antenna and transposes it either to baseband or to an intermediate frequency, before it is sampled,
- one or more analog-to-digital converters (ADC) 13 for sampling the signals from the receive systems 12,
- a weighting unit 14 for applying complex weightings to the sampled signals, and
- an adder 15 for summing the sampled and weighted signals.

Computation beamforming is the result of this complex process of weighting and summation.

Note that FIG. 1 relates to the example of complex sampling on two channels in phase quadrature. Under some conditions, and without in any way changing the general principle of the invention, complex sampling can be effected on a single channel, with a different sampling frequency.

In practice, in a telecommunication satellite payload, computation beamforming is integrated into a digital processor (not shown) that provides other functions of the payload, such as input signal demultiplexing, for example. Beamforming as such is controlled by a control processor (not shown) which, among other things, updates the weighting coefficients.

The receive system 12 has an analog part, for amplifying the radio frequency signal and transposing its frequency to a frequency compatible with sampling, and a sampling unit.

Digital sampling of the signals from each of the radiating elements 11 (or groups of radiating elements) enables processing of the signals (unlike an analog beamforming network, for which only the output is available). Moreover, once sampled, and subject to correct rating of the computer at each step of the computation, the signals suffer only negligible degradation compared to the degradation caused by the analog part of the system. Furthermore, simply by duplicating the signal, digital sampling enables the sampled signals to be used as many times as necessary, for example in processing that is ancillary to beamforming as such, such as the processing of the method in accordance with the present invention to be described in detail later.

Computation beamforming therefore has many advantages for telecommunication satellite payloads, especially for telecommunication antennas with multibeam coverage, such as those used on geosynchronous satellites. In a computation beamforming network, the signal is copied without losses and can therefore be used in the formation of a plurality of beams, instead of being divided, as in analog systems. Computation beamforming is already used with a reflector array antenna on the Thuraya satellite.

Figure 2:
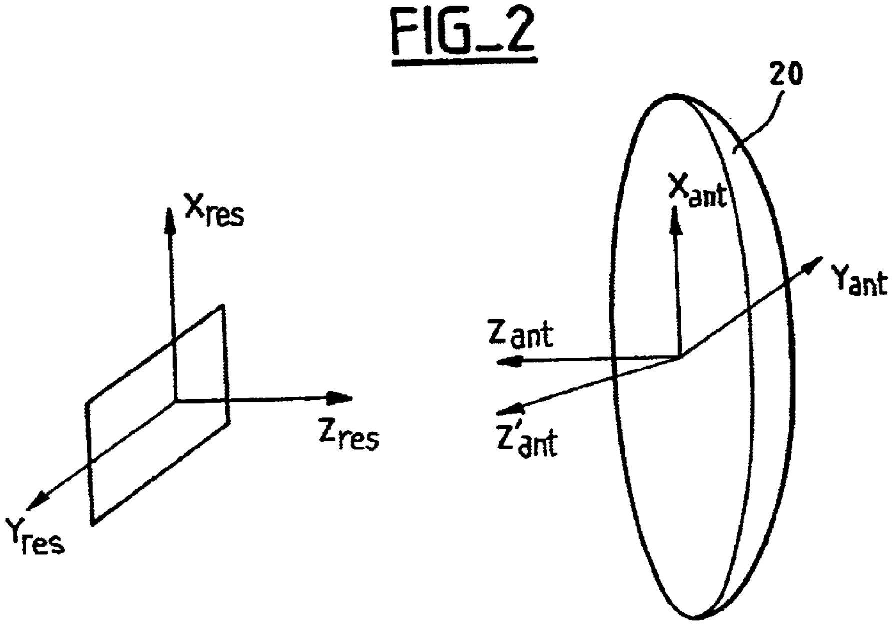

How the method of the invention works with a reflector array antenna of a geosynchronous satellite with multibeam coverage using receive computation beamforming is described next with reference to FIGS. 2 to 4.

The signal received by a reflector antenna cannot be expressed in a simple analytical form. The method of the invention therefore necessitates, first of all, modeling the received signal to find the relationship that links it to the "ideal" signal, as a function of the pointing error of the antenna.

In the event of depointing of the antenna, the axis of the antenna and reflector combination no longer points in the fixed nominal pointing direction, but in a direction offset relative thereto. This is shown in FIG. 2, which shows the antenna reflector 20 and in which:

- $(x_{res}, y_{res}, z_{res})$ is a system of axes that defines the plane of the array,
- $(x_{ant}, y_{ant}, z_{ant})$ is a system of axes that defines the nominal pointing of the antenna, related to the nominal position of the reflector, and
- $(x'_{ant}, y'_{ant}, z'_{ant})$ is a system of axes that defines the actual pointing of the antenna.

Depointing of the antenna, which moves from the theoretical pointing axis $z_{ant}$ to the real (offset) pointing axis $z'_{ant}$, can be broken down into two successive rotations:

- rotation through an angle $\epsilon_x$ about an axis orthogonal to $x_{res}$ and parallel to the plane $(x_{res}, y_{res})$, and
- rotation through an angle $\epsilon_y$ about an axis orthogonal to $y_{res}$ and parallel to the plane $(x_{res}, y_{res})$.

In the context of the present invention, it has been shown that depointing of the antenna along these two axes corresponds to translation of the radiated field in the focal plane of the reflector 20, i.e. spatial offsetting of the signals received by the radiating elements. The depointing of the antenna is equivalent to an offsetting of the apparent angle of incidence of waves impinging on the antenna. FIG. 3 therefore shows, for a plane incident wave in a given direction, the amplitude of the nominal radiated field in the focal plane P of the reflector 20, shown by the continuous line curve 30, and the amplitude of the radiated field offset in the focal plane, shown by the dashed line curve 30'. The nominal direction of the incident wave impinging on the reflector 20 is shown by the continuous line D in FIG. 3 and the offset direction of the incident wave, due to the pointing error of the antenna, is shown by the dashed line D' in FIG. 3.

Figure 3:
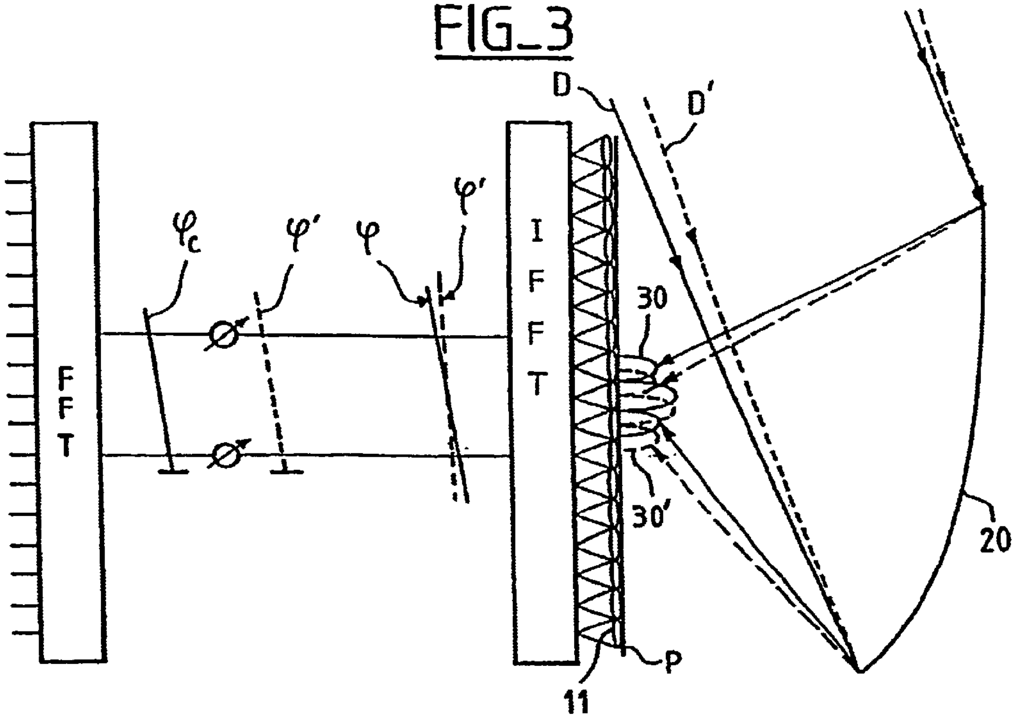
FIG. 3 is a diagram showing the principle of repainting in accordance with the invention.

FIG. 3 also shows in continuous line the equivalent nominal phase plane $\phi$ following application of the inverse Fourier transform and in dashed line the offset phase plane $\phi'$.

Because, when a Fourier transform is effected, a spatial offset becomes a multiplication by a pure phase, compensation in accordance with the invention by computing the translation of the radiated field in the focal plane due to the depointing of the antenna amounts to multiplying the inverse Fourier transform of the signals received by a pure phase, in other words to multiplying the inverse Fourier transform of the signals picked up by the radiating elements 11 of the antenna by a phase plane. This is shown in FIGS. 3 and 4.

It is important to note that, in the context of the present invention, whenever a Fourier transform is referred to, the transform links the angles of the antenna pattern to linear coordinates in the focal plane, rather than linking the time domain to the frequency domain. The direct and inverse Fourier transforms are therefore spatial transforms applied to samples received simultaneously by the various radiating elements.

Assume that the pointing error is known (how it can be estimated in accordance with the invention is described below with reference to FIG. 5). FIG. 4 shows the reflector 20 of the antenna to be repainted, the radiating elements 11 of the array of the antenna sending the signals picked up (after they have been sampled in accordance with the principle explained with reference to FIG. 1) to a computer 40 for computing the discrete inverse Fourier transform of the signals.

Another function 41 of the computer then multiplies the inverse Fourier transform of the received signals by the phase plane. This is effected mathematically by obtaining the matrix product of the vector giving the components of the inverse Fourier transform of the signals picked up by the radiating elements and multiplied by the matrix corresponding to the phase shift.

After the product has been computed by the computer 41, the offset phase plane is corrected to obtain a corrected phase plane $\phi_c$ (see FIG. 3) identical to the nominal phase plane $\phi$.

The phase shift matrix can be broken down into the product of two matrices corresponding to the phase slopes to be applied to compensate respective depointings. Accordingly, $p_x$ is the component of the phase shift matrix that is a function of $\epsilon_x$ and $p_y$ is the component which is a function of $\epsilon_y$. Each of these two matrices depends only on the position of the radiating elements and the slope to be applied in the x and y directions.

Finally, the result obtained at the output of the computer 41 is fed to a final computer 42 which applies a Fourier transform to it in order to obtain signals equivalent to those actually picked up by the radiating elements 11, but repainted. The repainted signals can then be processed in the processor (not shown) on board the satellite to apply the usual processing, which is not described in more detail here.

It is important to note here that, in accordance with the invention, for a geosynchronous satellite multibeam antenna, the same phase slope simultaneously repoints all of the beams formed by the antenna, since it has been shown that the displacing of the focal spot due to the depointing of the antenna is, to a first order, independent of the direction of arrival of the incident plane wave.

The pointing correction method of the invention is explained above assuming that the angular pointing error is known. How the pointing error is detected in order to compute an estimate of the linear phase slope to be applied for repainting in accordance with the invention is explained below.

To estimate the linear phase shift slope to apply in order to correct the pointing error, one option is to estimate directly from sensors on board the satellite the apparent direction of arrival of the wave from a fixed terrestrial beacon at a known position and to deduce the depointing therefrom by comparison with the theoretical direction of arrival of that wave. However, that method can prove inadequate for detecting pointing errors of the order of a few hundredths of a degree.

This is why the present invention proposes using estimation by locking a closed loop system onto a reference given by a terrestrial beacon at a known position.

Estimation is based on the following principle. If a wave emitted by a point source is received simultaneously by two sensors, the amplitude and the phase of the signal seen by each of them varies as a function of the propagation medium, but not the relative values of the amplitude and the phase of the two signals, which are a function only of the direction of arrival of the wave.

In this instance, the ratio of the sum and difference signals from the two sensors (for example adjacent sources of the antenna) is used to estimate the phase slope to be applied. This assumes that there is a linear relationship that links the phase slope to be applied to $\Delta/\Sigma$, which is the ratio of the difference of the amplitudes of the signals from two adjacent sources to their sum. This is valid locally for small depointings.

Figure 4:
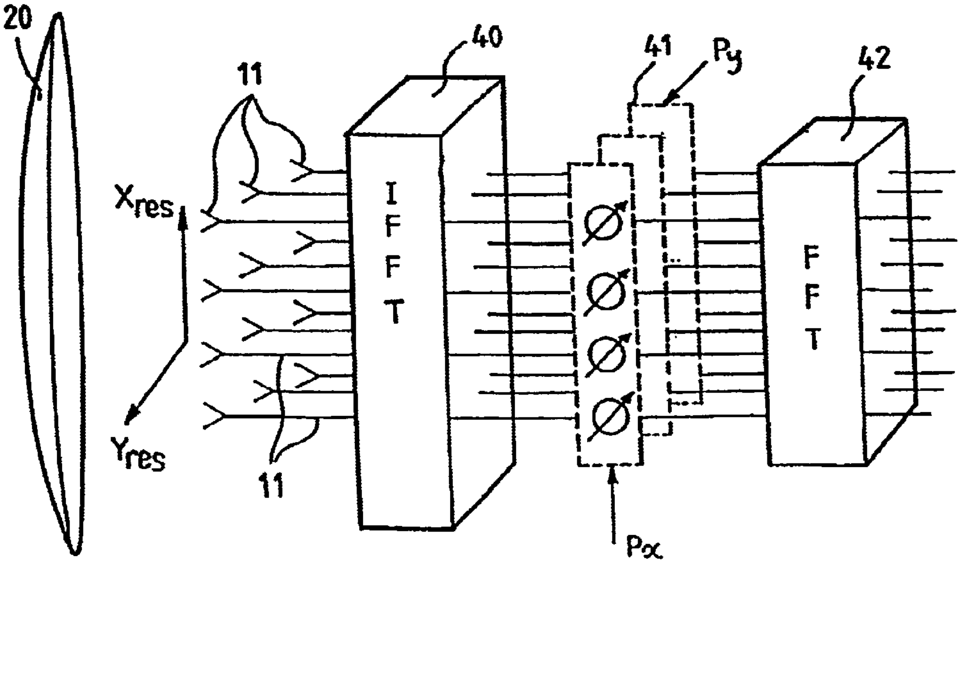
FIG. 4 is a diagram showing how the principle of repainting in accordance with the invention as shown in FIG. 3 is implemented functionally.
Figure 5:
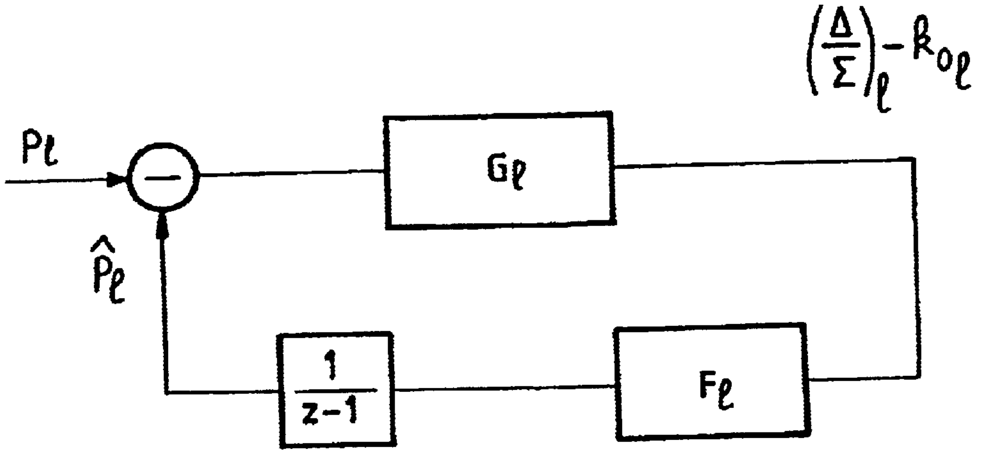
FIG. 5 is a diagram showing a digital loop for estimating the pointing error in accordance with the invention.

FIG. 4 shows diagrammatically the digital loop for computing the slopes of the linear phase plane to be applied to repoint the pattern.

In the figure, the index 1 represents x or y and:

$k_0$ is the nominal value $\Delta/\Sigma$, without depointing (nominal pointing), $G_1$ is the transfer function that relates $p_1-\hat{p}_1$ (estimated from $p_1$) to $\Delta/\Sigma-k_0$, i.e. the gain of the detector, $F_1$ is the return coefficient of the first order loop, and must chosen to respect the loop stability conditions, and $1/(z-1)$ is the digital loop integrator, expressed with the conventional variable z.

To estimate $p_1$, the loop is locked on $k_0$ to an accuracy set by the user, and which must be chosen as a function of the noise floor, and the accuracy that can be achieved with $k_0$.

Accordingly, a receive control loop is used to estimate the pointing error subsequently needed by the repainting method according to the invention. This loop uses fixed beacons as references, which is why it initially operates only in receive mode. However, once the estimate has been made by this control loop, the principle of the invention can then be applied to the signals transmitted by the antenna.

The invention can therefore repoint all the beams of a multibeam reflector array antenna simultaneously.

Also, it uses a digital method, which is therefore not limited in terms of computing power and therefore ensures accurate pointing.

Furthermore, it does not require antennas and receivers dedicated to estimating the pointing error.

Finally, it necessitates only the use of a processor already present in a satellite, i.e. it does not have to have recourse to bulky and costly mechanical motors.

When the correction has been computed by the method according to the invention (as claimed in claims 1 to 6), it can advantageously applied merely to updating the feed laws. These laws can then be corrected simultaneously for all the beams by applying an inverse FFT and then the phase law which is the opposite of that computed by the method of the invention, and computing the FFT. The benefit of this mode of application is that it can be used to recompute only the laws, at a frequency related to the depointing of the antenna, which will be of the order of 1 Hz. When computing the inverse FFT, phase shift, and FFT of the signals, the computations must be carried out at a frequency equal to the signal sampling frequency, which is several tens or even several hundreds of MHz.

Of course, the invention is not limited to the embodiment described above.

In particular, as already indicated, the method of the invention can apply simultaneously to receiving and sending.

Moreover, the proposed method of estimating the pointing error, although particularly beneficial, can be replaced by another estimation method known to the person skilled in the art, which need not be described in more detail here.

Finally, any means can be replaced by equivalent means without departing from the scope of the invention.

What is claimed is:

1. A method of repointing a reflector array antenna comprising a plurality of radiating elements and being of the type that forms beams by computation, in which method each signal received by said antenna is sampled, said method comprising the following operations:

estimating the depointing of the radiation pattern of said antenna to obtain a phase shift matrix, computing the discrete inverse Fourier transform of the signal samples supplied by the radiating elements, multiplying said phase shift matrix by said inverse Fourier transform of said sampled signal, and computing the discrete direct Fourier transform of the product of said phase shift matrix and said inverse Fourier transform of said sampled signal.

2. A method according to claim 1, wherein said Fourier transforms link the angles of the radiation pattern of said antenna to linear coordinates in the focal plane of said reflector.

3. A method according to claim 1, wherein sampling is effected after transposing the frequency of the radio frequency signal down to a frequency in an intermediate frequency band or in baseband.

4. A method according to claim 1, wherein, to obtain said phase shift matrix, the depointing is estimated by a first order digital closed loop from the known position of at least one fixed beacon.

5. A method according to claim 4, wherein said digital closed loop uses the ratio of the difference of the amplitudes of the signals obtained from two adjacent radiating elements of said antenna to their sum.

6. A method according to claim 1, wherein said beams formed by computation are repointed simultaneously.

7. A method of repointing a reflector array antenna comprising a plurality of radiating elements and being of the type that forms beams by computation, in which method each signal ready to be sent by said antenna is also sampled, said method comprising the following operations:

estimating the depointing of the radiation pattern of said antenna to obtain a phase shift matrix, computing the discrete direct Fourier transform of the signal samples to be transmitted by the radiating elements at a given time, multiplying said phase shift matrix by said direct Fourier transform of said sampled signal, and computing the discrete inverse Fourier transform of the product of said phase shift matrix and said direct Fourier transform of said sampled signal.

* * * * *